United States Patent
Regan et al.

[15] 3,683,092
[45] Aug. 8, 1972

[54] METHOD OF ANESTHESIA

[72] Inventors: Bernard M. Regan; John C. Longstreet, both of Chicago, Ill.

[73] Assignee: Baxter Laboratories, Inc., Morton Grove, Ill.

[22] Filed: July 31, 1970

[21] Appl. No.: 60,130

Related U.S. Application Data

[63] Continuation-in-part of Ser. No. 771,365, Oct. 28, 1968, abandoned.

[52] U.S. Cl. ................................................. 424/342
[51] Int. Cl. ............................................. A61k 13/00
[58] Field of Search ................... 424/342; 260/614 F

[56] References Cited

UNITED STATES PATENTS 3,476,860   11/1969   Croix et al. ................ 424/342
3,527,814   9/1970   Croix et al. ................ 424/342

*Primary Examiner*—Jerome D. Goldberg
*Attorney*—Scott J. Meyer

[57] ABSTRACT

The method of inducing anesthesia by administering an anesthetically effective amount of the compound fluoromethyl 1,1,1,3,3,3-hexafluoro-2-propyl ether.

3 Claims, No Drawings

METHOD OF ANESTHESIA

CROSS-REFERENCE TO RELATED APPLICATION

This is a continuation-in-part of co-pending application Ser. No. 771,365, filed Oct. 28, 1968 now abandoned.

This invention relates to the fluorinated ether, fluoromethyl 1,1,1,3,3,3-hexafluoro-2-propyl ether, having the structure $CH_2F\text{-}O\text{-}CH(CF_3)_2$.

In recent years, several fluorinated ethers have been found to have useful anesthetic properties, notably methoxyflurane, $CH_3OCF_2CHCl_2$; fluroxene, $CF_3CH_2OCH = CH_2$; roflurane, $CH_3OCF_2CHBrF$; and ethrane, $CHF_2OCF_2CHClF$.

With the recent availability of various polyhalo isopropanols, which serve as excellent starting materials for the corresponding methyl ethers, certain anesthetic halogenated isopropyl methyl ethers have been developed. U.S. Pat. No. 3,476,860 describes a group of halogenated derivatives of fluorinated isopropyl methyl ethers of which two compounds, namely, $CF_3(CF_2Cl)CHOCH_2Cl$ and $(CF_3)_2CHOCH_2Cl$, were stated to be anesthetic. That patent also describes the preparation of several other related compounds, for example, $(CF_3)_2CHOCHF_2$ and $(CF_3)_2CHOCHFCl$.

Surprisingly and unexpectedly, it has now been found that the present fluoromethyl 1,1,1,3,3,3-hexafluoro-2-propyl ether, which was not mentioned in U.S. Pat. No. 3,476,860, is an outstanding anesthetic agent. On the other hand, the foregoing two specific compounds suggested as anesthetic agents in said patent, and several of the other related compounds described in said patent, have now been found upon further testing to have undesirable properties which mitigate against their use as clinically useful anesthetics.

That is, it has now been found that when administered to dogs in repeated doses for long periods of time, the compounds having a chlorinated methyl group, for example, $(CF_3)_2CHOCH_2Cl$, are unstable and toxic to the animal, while that compound having a difluorinated methyl group, for example, $(CF_3)_2CHOCHF_2$, is convulsant. The monochlorinated compound, $(CF_3)_2CHOCHFCl$, also produces opisthotonus in mice. On the other hand, the present fluoromethyl 1,1,1,3,3,3-hexafluoro-2-propyl ether exhibits outstanding anesthetic properties over repeated and long term dosage administration in dogs. Consequently, the present compound has an unexpected and unobvious utility not exhibited by those compounds mentioned in U.S. Pat. No. 3,476,860.

Although the present inventors are not to be bound by theory, it is believed that the instability and toxicity of the chlorinated ether, $(CF_3)_2CHOCH_2Cl$, is due to the hydrolysis or breakdown of this compound to the reaction products formaldehyde, hydrochloric acid and hexafluoroisopropanol. This toxicity is believed to be due primarily to the formation of the formaldehyde and hydrochloric acid since upon intravenous administration of hexafluoroisopropanol to dogs, the latter compound by itself was not found to be toxic. These reaction products have been found to be formed during long term dosage administration of the anesthetic, $(CF_3)_2CHOCH_2Cl$, in an amount of about 170 times the amount that the corresponding reaction products are formed with the present fluoromethyl 1,1,1,3,3,3-hexafluoro-2-propyl ether.

The outstanding utility of the fluoromethyl 1,1,1,3,3,3-hexafluoro-2-propyl ether of the present invention is further highlighted by comparison with isomers of that compound which do not have this utility. For example, the compound $CH_3OCF(CF_3)_2$ was found to be non-anesthetic up to 8 percent by volume in oxygen, which means that it would burn at its anesthetic concentration since its lower flammability limit is about 7 to 8 percent. Another isomer, the trifluoromethyl 2,2,3,3-tetrafluoropropyl ether of Aldridge and Shepherd, *J. Org. Chem.*, Vol. 29, pages 11–15 (1964), has been shown to cause violent convulsions and deaths in mice at a concentration as low as 0.5 percent. Yet another isomer, $CHF_2OCH_2CF_2CF_3$, is non-anesthetic up to its lethal concentration and produces convulsions in mice. In still another comparison, it has been found that the isomeric $(CHF_2)_2CF\text{-}O\text{-}CHF_2$ is a weak anesthetic in which deep anesthesia is not obtained and abnormal EEG (electroencephalographic) and convulsant activity is observed.

All of the foregoing comparisons between the novel fluorinated ether of this invention and several isomeric ethers further supports the unobvious and unexpected utility of the present invention.

The fluoromethyl 1,1,1,3,3,3-hexafluoro-2-propyl ether of this invention is a volatile liquid, is non-flammable in air at ambient temperatures and has a lower flammability limit in oxygen of about 11.8 volume percent, which is about three times its anesthetic maintenance concentration in dogs.

Fluoromethyl 1,1,1,3,3,3-hexafluoro-2-propyl ether is prepared by several methods. In one method, the chloromethyl 1,1,1,3,3,3-hexafluoro-2-propyl ether is first prepared by the free radical chlorination of 1,1,1,3,3,3-hexafluoro-2-propyl methyl ether and, more preferably, by a photo induced reaction between about 0.5 to about 1 mole of chlorine per mole of the hexafluoro-2-propyl methyl ether and a temperature of from about 20° C. to about 65° C. The chlorine is then replaced with fluorine in the methyl group. In this replacement reaction, the chloromethyl ether is reacted with from about 1 to about 3 molar equivalents of dry potassium fluoride in the presence of a mutual solvent, for example, an organic solvent such as tetrahydrothiophene 1,1-dioxide, under essentially anhydrous conditions and a temperature of from about 80° C to about 180° C.

Another method of preparation of the present anesthetic compound involves the reaction of the corresponding methyl ether and bromine trifluoride in accordance with a general procedure disclosed by Yuminov et al., *Zh. Obshch. Khim.*, Vol. 37, pages 375–380 (1967); Chem. Abstracts, Vol. 67, No. 43357x. In this reaction, fluoromethyl 1,1,1,3,3,3-hexafluoro-2-propyl ether is prepared from 1,1,1,3,3,3-hexafluoro-2-propyl methyl ether and from about 0.5 to about 1.0 molar equivalent of bromine trifluoride, preferably about two-thirds of a molar equivalent, by refluxing at about 20° C to about 50° C.

Still another method of preparation of the present anesthetic ether involves the reaction of 1,3-polyfluoro-2-propanol, formaldehyde and hydrogen fluoride in accordance with a general procedure described by Weinmayr, U.S. Pat. No. 2,992,276.

Surprisingly and unexpectedly, the compound of the present invention cannot be prepared by the halogen replacement methods described in examples 3 and 4 of U.S. Pat. No. 3,476,860, which involve the reaction of the corresponding chlorinated ether and antimony trifluoride. That is, the fluoromethyl 1,1,1,3,3,3-hexafluoro-2-propyl ether cannot be prepared by the reaction of $(CF_3)_2CHOCH_2Cl$ and antimony trifluoride as is taught in said patent for the preparation of the corresponding $(CF_3)_2CHOCHF_2$ and $(CF_3)_2CHOCHFCl$.

In general, the anesthetic compound of this invention is administered by the inhalation route to warm blooded, air breathing animals in an amount of from about 1 percent to about 5 percent by volume in admixture with from about 99 percent to about 95 percent by volume of oxygen or a gaseous mixture containing oxygen in sufficient amount to support respiration.

Although specific methods of administration of the fluoromethyl 1,1,1,3,3,3-hexafluoro-2-propyl ether as an anesthetic agent are described herein, it will be understood that this compound is not limited to any particular method of administration. Thus, the fluorinated ether of this invention can be admixed with one or more other anesthetic agents in order to achieve advantages in administration, degree of relaxation, safety and the like. For example, the present compound can be admixed with suitable proportions of known anesthetics such as nitrous oxide, ethyl ether, cyclopropane, halothane, ethyl vinyl ether and the like anesthetic adjuncts. In nitrous oxide, the lower flammability limit of fluoromethyl 1,1,1,3,3,3-hexafluoro-2-propyl ether is 10 percent by volume whereas the lower flammability limit of the analagous chloromethyl 1,1,1,3,3,3-hexafluoro-2-propyl ether of U.S. Pat. No. 3,476,860 in nitrous oxide is 6 percent by volume. The significance of this advantage is apparent since the use of nitrous oxide along with oxygen is known to generally have an adverse effect upon the flammability of organic compounds.

The fluorinated ether of this invention can also be injected directly into the body by means of a catheter or shunt [see, e.g., Folkman et al., Science, Vol. 154, pages 148–149 (1966)] or can be prepared in an emulsion form of the oil-in-water type and injected into the animal to evolve satisfactory anesthesia [see, e.g., Krantz et al., *Anesth. and Analg.*, Vol. 41, pages 257–262 (1962 and U.S. Pat. No. 3,216,897]. The anesthetic agent enters the central nervous system via the circulatory blood and leaves the body in the exhaled air in a manner analagous to the inhalation route of administration. Still other methods of administration will be apparent to those skilled in the art.

The following examples will further illustrate the present invention although the invention is not limited to these specific examples. All parts and percentages set forth herein are on a weight basis unless otherwise specified.

EXAMPLE 1

Chloromethyl 1,1,1,3,3,3-Hexafluoro-2-propyl Ether

Chlorine gas (165 grams, 2.32 moles) was bubbled into 1,1,1,3,3,3-hexafluoro-2-propyl methyl ether (420 grams, 2.32 moles) during four hours. After 5 minutes, the reaction was initiated by illumination with a sun lamp through a Pyrex reaction flask for about 5 minutes. Thereafter, the exothermic reaction was allowed to proceed autogeneously under partial reflux (hydrogen chloride emitted) employing a Dry Ice condensor. The reaction product was washed successively with cold water, a small amount of aqueous sodium bisulfite and cold water made slightly alkaline with sodium hydroxide. The washed product weighed 478 grams. It was dried by azeotropic distillation and then fractionally distilled at 747 mm. Hg. A forerun of 79 grams, b 65°–77.2° C, was first obtained. The next 281 grams, b 77.2°–77.3° C, was chloromethyl 1,1,1,3,3,3-hexafluoro-2-propyl ether of 99.8 percent purity by gas liquid chromatography (GLC) and with a density of 23° C of about 1.517. The $CH_2Cl-O-CH(CF_3)_2$ structure was confirmed by a proton nuclear magnetic resonance (NMR) spectrum.

EXAMPLE 2

Chloromethyl 1,1,1,3,3,3-Hexafluoro-2-propyl Ether

Dry chlorine gas (685 grams, 9.66 moles) was bubbled at an average rate of 31 grams per hour into methyl 1,1,1,3,3,3-hexafluoro-2-propyl methyl ether (2,712 grams, 14.9 moles) at 20° to 25° C with illumination by an immersion-type water cooled ultraviolet lamp through a Pyrex sleeve. The reaction flask was surmounted by a cold water condensor, and this condensor was surmounted by a Dry Ice cooled condensor connected to a Dry Ice cooled trap which permitted the release of hydrogen chloride. The product was washed with ice cold water, cold dilute aqueous sodium hydroxide solution, and cold water. It was separated, dried by azeotropic distillation, and fractionally distilled to recover 1,1,1,3,3,3-hexafluoro-2-propyl methyl ether (1,171 grams), $b_{750}$ 50.2° to 51.0° C, of 99.9 percent purity by GLC. Subsequently, a chloromethyl 1,1,1,3,3,3-hexafluoro-2-propyl ether fraction (1,346 grams), $b_{750}$ 77.0° to 77.2° C, of 99.9 percent purity by GLC was obtained.

EXAMPLE 3

Fluoromethyl 1,1,1,3,3,3-Hexafluoro-2-propyl Ether

A solution of chloromethyl 1,1,1,3,3,3-hexafluoro-2-propyl ether (754 grams, 3.49 moles) in dry tetrahydrothiophene 1,1-dioxide (2,000 ml) and dry, powdered potassium fluoride (203 grams, 3.49 moles) were stirred and heated to 130° C in a creased flask fitted with a fractional distillation assembly. A distillate (200 ml), $b_{748}$ 56.0° to 62° C, was collected during 5 hours. Then the reaction mixture was cooled to room temperature, dry potassium fluoride (100 grams, 1.74 moles) was added, and the cycle of operations was repeated three times at temperatures between 138° to 185° to give distillates (100 ml, 100 ml and 50 ml), $b_{746}$ 58° to 61° C, 55.5° to 57° C, and 54.2° to 55.9° C, respectively. From this portionwise addition of potassium fluoride (503 grams total, 8.7 moles) there was obtained distillates totalling 672 grams, $b_{746}$ 54.2° to 62.0° C, which by GLC analysis was about 92 percent fluoromethyl and 6.8 percent chloromethyl 1,1,1,3,3,3-hexafluoro-2-propyl ethers. The combined distillates were dried over anhydrous calcium sulfate (33 grams) and filtered.

Fractional distillation of 659 grams gave a forerun (46 grams), $b_{745}$ 53.5° to 57.0° C, and then 99.6 percent pure fluoromethyl 1,1,1,3,3,3-hexafluoro-2-propyl ether (505 grams), $b_{745}$ 57.0° to 57.7° C. There remained 94 grams of undistilled substance.

The fluoromethyl ether fraction (311 grams), $b_{745}$ 57.5° to 57.7° C, was 99.9 percent pure by GLC and had a density of 1.505 at 23° C.

EXAMPLE 4

Fluoromethyl 1,1,1,3,3,3-Hexafluoro-2-propyl Ether

Bromine trifluoride (14.5 ml, 0.34 mole) was added portionwise during two hours to 1,1,1,3,3,3-hexafluoro-2-propyl methyl ether (45 ml, 0.34 mole) with stirring in a Pyrex flask fitted with a reflux condenser and a Teflon syringe and needle. A vigorous exothermic reaction occurred at about 20° C and higher. The reaction temperature was maintained between 20° and 50° C with the aid of a water bath. A proton NMR spectrum of the product indicated the conversion of the methyl ether to the corresponding fluoromethyl ether was substantially complete. The product was washed with aqueous sodium sulfite, aqueous sodium hydroxide, and water to decolorize and neutralize. The washed product (61 grams) was dried over anhydrous calcium chloride and shown by GLC analysis to be 97.5 percent fluoromethyl 1,1,1,3,3,3-hexafluoro-2-propyl ether.

EXAMPLE 5

Fluoromethyl 1,1,1,3,3,3-Hexafluoro-2-propyl Ether 1,1,1,3,3,3-hexafluoro-2-propyl methyl ether (622 grams, 3.41 moles) was stirred in a reactor fitted with an additional funnel containing bromine trifluoride (301 grams, 2.20 moles) and a cold water condenser connected to an ice-cooled trap. The $BrF_3$ was added portionwise, and the temperature of the reactants adjusted between 25° and 50° C so that the reaction progressed at a rapid but controllable rate. When the reaction was complete, water was cautiously added to decompose any $BrF_3$ which remained. The reaction product was freed of hydrogen fluoride and bromine by successive washings with water, sodium sulfite solution and water. The washed product was dried by freezing out water at −20° C. The dried product weighed 541 grams and was 98.3 percent fluoromethyl 1,1,1,3,3,3-hexafluoro-2-propyl methyl ether and 1.7 percent the starting methyl ether by gas-liquid chromatography. In addition, the trap contained 92 grams of about a 1:1 mixture of these fluoromethyl and methyl ethers. Fractional distillation of the 541 grams of product gave purified fluoromethyl 1,1,1,3,3,3-hexafluoro-2-propyl ether: 343 grams of better than 99.9 percent purity, $b_{751}$ 58.1° − 58.2° C, $d_4^{23}$ 1.505; and 95 grams of better than 99.0 percent purity.

EXAMPLE 6

Fluoromethyl 1,1,1,3,3,3-Hexafluoro-2-propyl Ether 1,1,1,3,3,3-hexafluoro-2-propanol, paraformaldehyde and anhydrous hydrogen fluoride in a, respective, 1:2:4 molar ratio were stirred at about 9° C. In about 30 minutes, the homogeneous mixture began to deposit a crystalline product. After about 2 hours, this product was collected by filtration, washed with water, and then allowed to dry overnight in room air, m.p. 52.5° C, yield 52 percent by weight based on hexafluoro-2-propanol. After one recrystallization from carbon tetrachloride, this compound had m.p. 54.6° C and micro b.p. 154.5° C at 753 torr. The proton NMR spectrum of this compound in $CCl_4$ (0.10 g./ml.) showed a singlet ($\delta = 4.27$ ppm) and a septet ($\delta = 3.60$ ppm, J = 6Hz) in an area ratio of 2:1. The chemical shifts ($\delta$) are given relative to internal tetramethyl silane. A tentative structure for this compound is $[(CF_3)_2CH—O—CH_2]_2O$. The latter compound (m.p. 54.6° C) and anhydrous hydrogen fluoride in a 1:1.33 weight ratio were heated in a steel autoclave for two hours at 90° −110° C, then for 4 hours at 150° − 180° C and then cooled. After removal of hydrogen fluoride, the remaining liquid, water-immiscible product (40 percent by weight based on the compound m.p. 54.6° C) was found by proton nuclear magnetic and gas-liquid chromatographic analyses to be about 90 percent fluoromethyl 1,1,1,3,3,3-hexafluoro-2-propyl ether.

EXAMPLE 7

The fluoromethyl 1,1,1,3,3,3-hexafluoro-2-propyl ether of this invention was shown to have useful anesthetic properties in mice essentially according to the procedure described by Robbins, *J. Pharmacol. Exptl. Therap.*, Vol. 86, pages 197–204 (1946). The five minute median anesthetic concentration, $AC_{50}$, and the 5 minute median lethal concentration, $LC_{50}$, were determined by a log-probit plot of the data as described by Miller and Tainter, *Proc. Soc. Exptl. Biol. Med.*, Vol. 57, pages 261–264 (1944). The number of test mice used was 30 for each of the $AC_{50}$ and $LC_{50}$ concentrations. Fluoromethyl 1,1,1,3,3,3-hexafluoro-2-propyl ether was found to have an $AC_{50}$ of 1.42 volume percent and an $LC_{50}$ of 8.38 volume percent, or an anesthetic margin of safety ($LC_{50}/AC_{50}$) of 5.9 in mice. Identical tests with several anesthetics in general use gave the following results:

halothane, $LC_{50}/AC_{50} = 2.74/0.78 = 3.5$;
diethyl ether, $LC_{50}/AC_{50} = 13.6/3.83 = 3.5$;
fluroxene, $LC_{50}/AC_{50} = 11.6/3.5 = 3.3$;
methoxyflurane, $LC_{50}/AC_{50} = 2.52/0.56 = 4.5$.

EXAMPLE 8

In order to demonstrate the unexpected and unobvious outstanding anesthetic properties of the fluoromethyl 1,1,1,3,3,3-hexafluoro-2-propyl ether compared to the corresponding properties of various of its isomers and analagous compounds, the following tests were conducted:

Dogs and rats anesthetized 3 hours daily, 5 days per week for 2 weeks, with fluoromethyl 1,1,1,3,3,3-hexafluoro-2-propyl ether in oxygen showed no signs of toxicity. Anesthesia proceeded smoothly and rapidly, the anesthetic state was unmarked by convulsive movements or electro-encephalographic abnormalities, and recovery occurred within two minutes. On the other hand, chloromethyl 1,1,1,3,3,3-hexafluoro-2-propyl ether produced severe toxic signs and death in rats and dogs anesthetized 3 hours daily on 5 consecutive days. In mice, recovery time was undesirably prolonged to 18 to 20 minutes following only 10 minutes of anesthesia with $CF_3(CF_2Cl)CHOCH_2Cl$ and in mice anesthetized with $(CF_3)_2CHOCHFCl$, opisthotonus was observed during induction. In dogs, $(CF_3)_2CHOCHF_2$ produced anesthesia marked by convulsive movements and electro-encephalographic abnormalities. The compound $(CHF_2)_2CFOCHF_2$ caused loss of righting reflex in mice but produced only hypnosis and clonic convulsive activity with little analgesia in dogs.

EXAMPLE 9

In still another comparison between fluoromethyl 1,1,1,3,3,3-hexafluoro-2-propyl ether and several close analogs administered to dogs via the inhalation route, the following results were obtained:

densities and molecular weights, and application of the ideal gas law.

In this test, the $LFLO_2$ for fluoromethyl 1,1,1,3,3,3-hexafluoro-2-propyl ether was 11.8 and the ratio $LFLO_2/AC_{50}$ (using the $AC_{50}$ from Example 7, above) was 8.3. By way of comparison, the $LFLO_2$ for the

ANESTHETIC COMPARISON IN DOGS

| Compound | Number of test dogs | Induction Concentration, vol. percent | Time, minutes | Maintenance Concentration, vol. percent | Recovery time, minutes* | Results |
|---|---|---|---|---|---|---|
| $CHF_2-O-\underset{\underset{CF_3}{\|}}{\overset{\overset{H}{\|}}{C}}-CF_3$ | 8 | 5-8 | 5 | 4-5 | 5-25 | No significant side effects after single or repeated exposures. |
| $CH_2Cl-O-\underset{\underset{CF_3}{\|}}{\overset{\overset{H}{\|}}{C}}-CF_2Cl$ | 3 | 3.1 | 20 | 0.2-0.5 | No recovery. Cardiac failure. | Spontaneous leg movements during anesthesia, severe respiratory and cardiac depression. |
| $CHFCl-O-\underset{\underset{CF_3}{\|}}{\overset{\overset{H}{\|}}{C}}-CF_3$ | 1 dog, 4 exposures. | 5 | 15 | 2-3 | 20-30 | EEG seizure discharges and convulsive movements during anesthesia. |
| $CHF_2-O-\underset{\underset{CF_2Cl}{\|}}{\overset{\overset{H}{\|}}{C}}-CF_3$ | 2 | 3 | 15 | 0.5-1.0 | No recoveries | Spontaneous cardiac arrhythmias, high amplitude EEG spiking and convulsive movements during anesthesia. |

*Anesthesia maintained for 2-3 hours in each dog.

EXAMPLE 10

The flammability of gaseous mixtures of fluoromethyl 1,1,1,3,3,3-hexafluoro-2-propyl ether and oxygen were determined at room temperature and atmospheric pressure by visualization of the downward propagation of a flame in a glass bottle having a cylindrical portion 2.3 inches i.d. × 3.5 inches in height. The bottle was flushed with pure oxygen, a known quantity of the liquid anesthetic was added rapidly, and the bottle was closed with a ground glass stopper. The bottle was then rotated and shaken until the liquid anesthetic was completely vaporized and uniformly mixed with oxygen. The stopper was then removed and immediately a burning stick was inserted in the bottle 1.5 to 2.0 inches below the bottle mouth.

The lower flammability limit in oxygen, $LFLO_2$, of the gaseous anesthetic was defined as the concentration by volume percent of the anesthetic in the gaseous mixture at which downward flame propagation was observed.

The concentration by volume percent of the gaseous anesthetic in oxygen was calculated by well-known computation means employing the known volumes, methyl hexafluoro-2-propyl ether was 6.0 and its $LFLO_2/AC_{50}$ ratio was 2.70.

Various other examples and modifications or adaptations of the foregoing examples can be devised by the person skilled in the art after reading the foregoing specification and the appended claims without departing from the spirit and scope of the invention. All such further examples, modifications and adaptations are included within the scope of the invention.

What is claimed is:

1. The method of inducing anesthesia in animals comprising administering by inhalation to an animal an effective amount for inducing anesthesia of fluoromethyl 1,1,1,3,3,3-hexafluoro-2-propyl ether.

2. An inhalant anesthetic composition comprising the compound of claim 1 in gaseous admixture with oxygen in amounts suitable to maintain anesthesia and support respiration in an animal.

3. The method of inducing anesthesia in animals comprising administering by inhalation to an animal an effective amount for inducing anesthesia of the composition of claim 2.

* * * * *

UNITED STATES PATENT OFFICE
CERTIFICATE OF CORRECTION

Patent No. 3,683,092           Dated August 8, 1972

Inventor(s)   Bernard M. Regan and John C. Longstreet

It is certified that error appears in the above-identified patent and that said Letters Patent are hereby corrected as shown below:

In the specification, col. 7, in the table under Example 9, the first listed structural formula should appear as follows:

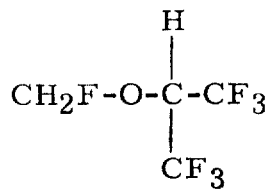

Signed and sealed this 6th day of August 1974.

(SEAL)
Attest:

McCOY M. GIBSON, JR.         C. MARSHALL DANN
Attesting Officer            Commissioner of Patents